(12) United States Patent
Cottard et al.

(10) Patent No.: US 6,349,955 B1
(45) Date of Patent: Feb. 26, 2002

(54) BICYCLE TRAILER

(75) Inventors: Andre Cottard; Guillaume Cottard, both of Olivet; Romain Blanquet, Saint-Saulve; Christophe Mortier, Saulces Champenoises, all of (FR)

(73) Assignee: Centre d'Innovation, Orleans (FR)

( * ) Notice: Subject to any disclaimer, the term of this patent is extended or adjusted under 35 U.S.C. 154(b) by 0 days.

(21) Appl. No.: 09/555,276

(22) PCT Filed: Oct. 26, 1999

(86) PCT No.: PCT/FR99/02651
§ 371 Date: Oct. 6, 2000
§ 102(e) Date: Oct. 6, 2000

(87) PCT Pub. No.: WO00/26079
PCT Pub. Date: May 11, 2000

(30) Foreign Application Priority Data

Oct. 30, 1998 (FR) .............................................. 98 13648

(51) Int. Cl.⁷ .............................................. B62K 27/00
(52) U.S. Cl. ....................................................... 280/204
(58) Field of Search .................................. 280/202, 204, 280/504, 515, 495, 499, 501

(56) References Cited

U.S. PATENT DOCUMENTS

| 4,413,835 A | 11/1983 | Hazelett ....................... 280/204 |
| 4,756,541 A | 7/1988 | Albitre ......................... 280/204 |
| 5,020,813 A | * 6/1991 | Gottschalk |
| 5,716,065 A | * 2/1998 | Liu |

FOREIGN PATENT DOCUMENTS

| CA | 1235435 | 4/1988 |
| DE | 9412046.3 | 11/1994 |

* cited by examiner

*Primary Examiner*—Kevin Hurley
(74) *Attorney, Agent, or Firm*—Duane, Morris, LLP

(57) ABSTRACT

The invention concerns a single-wheel trailer for all-terrain touring bike. The trailer is fixed on the saddle rod via hitch linkage (3) comprising a fixing part (9*a*,9*b*) on the saddle extended by a plate (11) from which projects a vertical shaft (13) whereon is articulated a fork joint (15) interlocked with a rod (16) of the trailer body.

7 Claims, 3 Drawing Sheets

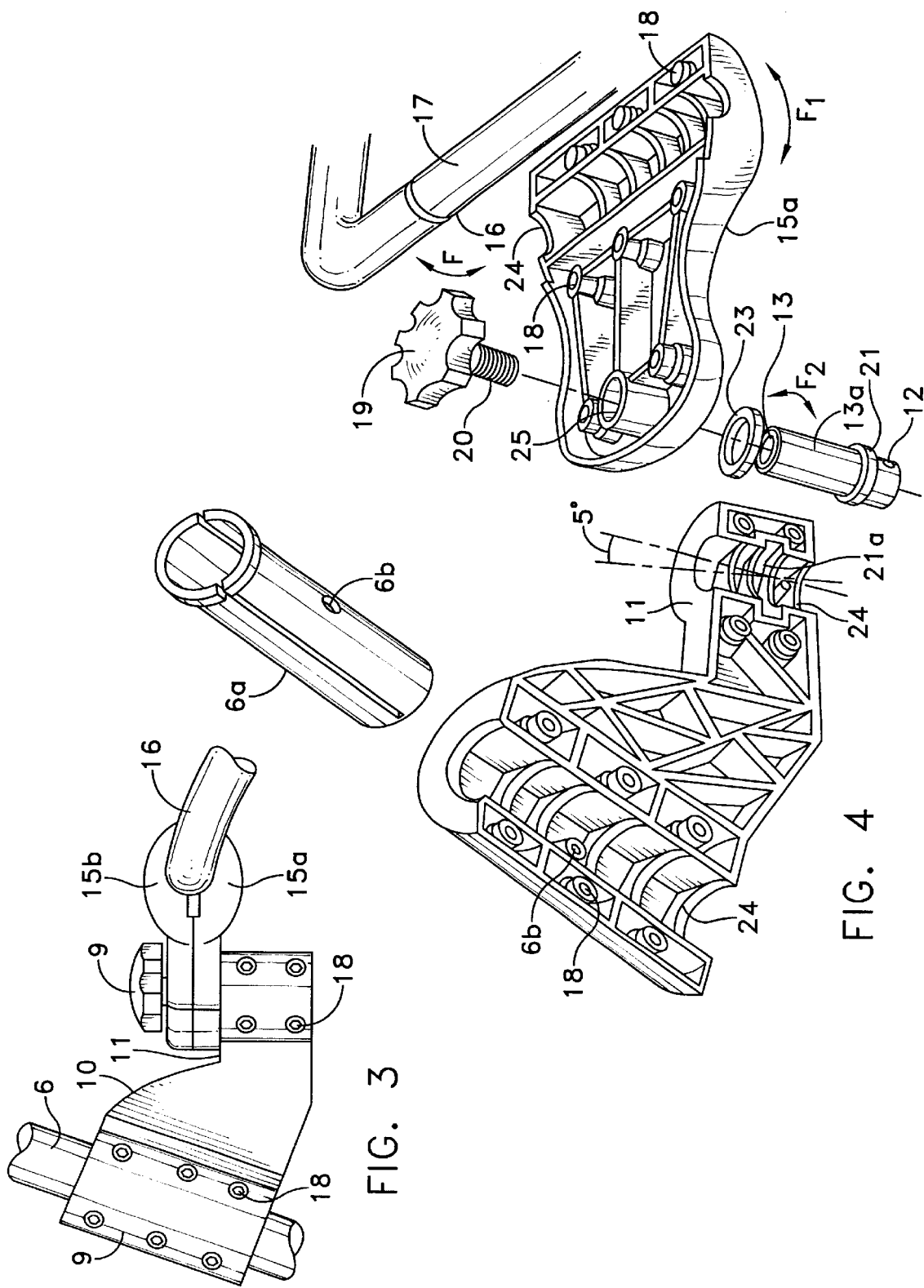

BICYCLE TRAILER

The present invention relates to a bicycle trailer, and it is intended particularly, but not exclusively, for touring and cross-country bicycles commonly known as "mountain bikes".

BACKGROUND OF THE INVENTION

In general, such trailers are known and the most usual type comprises a body carried on two wheels, with the body being attached to the bicycle beneath the saddle by means of a sleeve secured to a tow bar. The trailer can thus deviate angularly to a certain extent relative to the forward direction of the bicycle. However, such a trailer is unsuitable for a cross-country bicycle since by its very nature it is required to travel over uneven ground. That is to say the trailer must have several degrees of freedom, not only relative to the forward direction of the bicycle, but also relative to the plane in which the bicycle is to be found and which may slope in various ways. Unfortunately, such a trailer is essential for those who practice off-road bicycle touring.

Proposals have already been made to provide a single-wheel trailer, with the wheel being mounted on the chassis and at the rear thereof. This makes it easier for the trailer to tilt simultaneously with the cross-country bicycle. The trailer is attached to the hub of the rear wheel, thereby enabling the center of gravity of the load to be lowered. However, overall length is increased compared with that of a bicycle fitted with a conventional trailer.

A single-wheel cross-country bicycle trailer is also known constituted by a chassis attached to the seat tube, the wheel being located at the rear end of the trailer. However, under certain conditions of difference in height, unwanted pitching is observed while cornering, particularly when the cyclist is standing on the pedals.

In both cases, a bag containing clothing and/or food is fixed on or suspended from the metal chassis.

Canadian patent CA-B-1 235 435 describes a trailer towed by a bicycle to transport objects and children simultaneously. The trailer is connected to the seat tube via a pair of hinges, one about an axis parallel to the seat tube and the other about a horizontal axis mounted in a fork that can pivot about the substantially vertical axis. However, that assembly, which is designed for transporting children, is not at all suited to a mountain bike where the tow bar of the trailer is subjected to large amounts of shear.

OBJECTS AND SUMMARY OF THE INVENTION

A first object of the invention is to mitigate the drawbacks of known devices and to enable a lightweight trailer to be made capable of being attached by means of a suitable coupling to a cross-country bicycle that travels over winding paths, and to do so without causing the bicycle to be upset.

A second object of the invention is to provide a lightweight trailer constituted essentially by a metal chassis and a shell of plastics material forming a waterproof box even though it is still necessary for objects to be stowed securely therein in order to avoid any swinging motion.

The idea on which the invention is based consists in offsetting the pivot axes of the trailer away from the seat tube.

According to the invention, a trailer for a cross-country bicycle comprising a chassis and a single wheel has a tow bar suitable for connection to the seat tube via an articulated link, and said link comprises a piece fixed to the seat tube, which piece includes a sloping portion and a portion that is substantially horizontal, a pivot axis projecting from said horizontal portion, a fork including a horizontal attachment tube of the trailer being pivotally mounted on said vertical axis, the tube of the trailer being included in a rubber sleeve integrated in the fork.

The vertical or pivot axis is preferably mounted on the bracket via a rubber ring. In this way, the trailer can move relative to the bicycle:

in azimuth, by pivoting about the vertical axis;

in elevation, by causing its tube to pivot inside the fork; and in torsion, by elastic deformation of the sleeve and of the rubber ring, the rubber being relatively hard.

These resilient means also damp the propagation to the bicycle of any impact on the trailer, but without giving rise to oscillation.

Naturally, the terms "vertical" and "horizontal" are used to mean the positions of the various members when the bicycle and the trailer are at rest on a horizontal plane surface.

According to another characteristic of the invention, the trailer is constituted by a self-supporting tubular metal chassis covered by closed bodywork of a plastics material such as polyethylene.

The link piece between the seat tube and the tow bar is preferably molded out of a plastics material such as polyamide having hardness of 70 on the Shore scale, and constituted by two symmetrical shells assembled onto the seat tube by screws. This part of complex shape is thus made easier to manufacture.

According to yet another characteristic of the invention, the pivot axis slopes at an angle of about 5° relative to the vertical. When the trailer is going downhill, this disposition prevents the trailer jack-knifing to left or to right of the bicycle under its own weight, thereby causing the bicycle to fall over.

Furthermore, wear rings are provided throughout the articulated coupling so they can easily be replaced, thereby giving the trailer a long lifetime.

In another embodiment, the fork is articulated on a conical pivot, at the end of a shaft secured to the fork and turning inside at least one ball bearing.

BRIEF DESCRIPTION OF THE DRAWINGS

Other characteristics and advantages of the invention will appear on reading the following description of a particular embodiment, given purely by way of non-limiting example and with reference to the accompanying drawings, in which:

FIG. 3 is a side view of the coupling in the assembled condition;

FIG. 4 is an exploded view of the coupling;

MORE DETAILED DESCRIPTION

In the description below, the parts of the coupling are made of a plastics material such as polyamide, with the exception of the vertical pivot which is made of metal. In the figures, the same references are used to designate the same elements.

Figure 1:
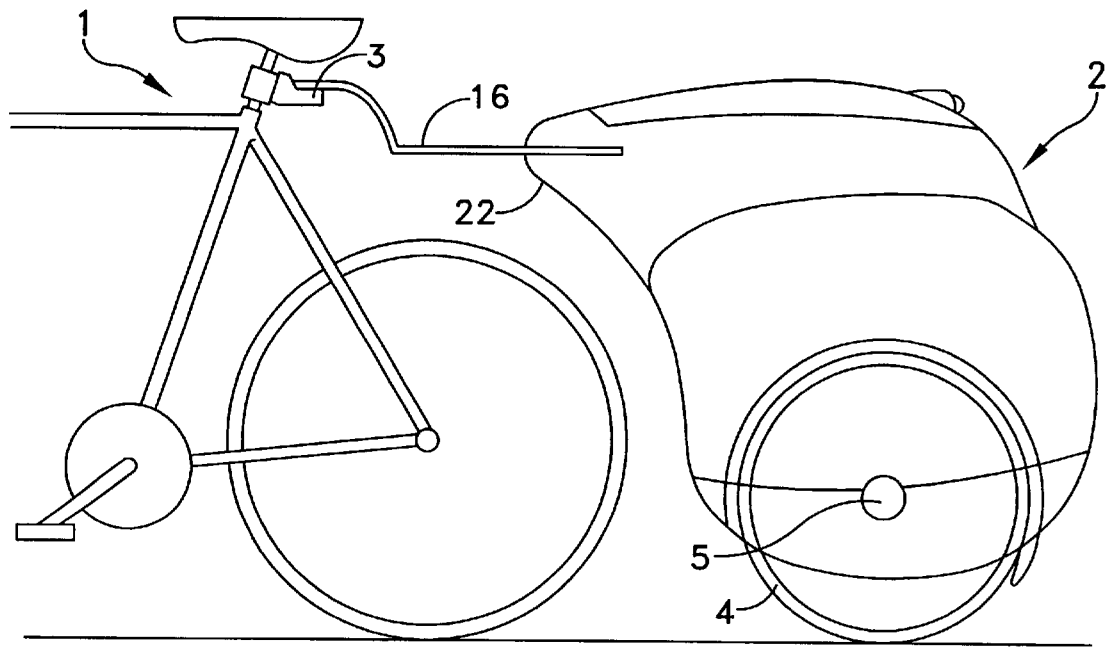
FIG. 1 is a side view of a trailer of the invention coupled to a bicycle.

In FIG. 1, the towing bicycle 1 is shown in part only. It is secured to a trailer 2 by means of a coupling 3 pivotally receiving a tow bar 16 secured to the chassis of the trailer 2. The trailer 2 stands on the ground via a single wheel 4. The wheel 4 rotates about an axle 5 which is rotatably mounted to the tubular chassis of the trailer (not shown). The trailer has a portion 22 located above a portion of the rear wheel of the bicycle. This characteristic makes it possible to ensure that the axis of the trailer wheel is relatively close to the axis of the rear wheel of the bicycle, and this is a factor that is favorable to stability.

Figure 2:
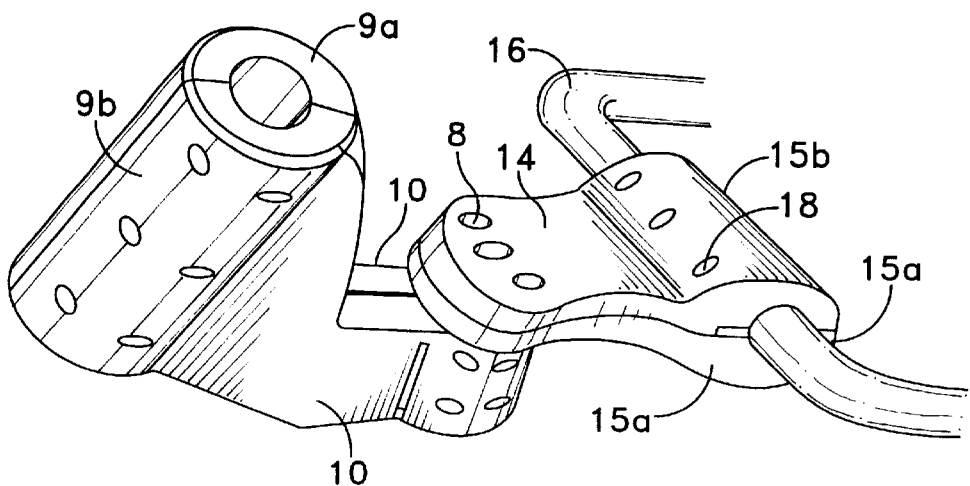
FIG. 2 is a perspective view of the parts constituting the coupling of the trailer when not assembled together.

As can be seen in FIGS. 2 to 4, the coupling 3 comprises two portions: a first portion fixed to the seat tube is constituted by a fixing plate 9 and a bracket 10; and a second portion constituted by a fork 15 is designed to receive a tube 16 secured to the trailer 2 and extending orthogonally to the seat tube 6. These two portions are united by a pivot axis 13 having two degrees of freedom. Each of the two molded portions is made of two shells which are united by screws co-operating with nuts, the screws preferably having polygonal heads, and all being of the same diameter and the same pitch so that they can all be tightened or loosened using a single tool. These means and the holes receiving them are all referenced 18.

FIG. 2 is a perspective view of the link portions constituting the coupling 3 between the bicycle 1 and the trailer 2. The coupling is secured to the seat tube 6 beneath the saddle (not shown).

The coupling 3 has a fixing plate 9 constituted by two shells 9a and 9b that are secured by screws, each of the parts 9a and 9b having a recess of semicircular section and of diameter substantially equal to that of the seat tube. The parts 9a and 9b are extended towards the rear of the bicycle by a bracket 10. A plate 11 projects from the bracket 10 and this plate is horizontal when in the rest position.

In FIG. 3, the coupling is shown in side view and there can be seen in this figure the seat tube 6, with the portion 9 fixed thereto and extended by the plate 10, 11 carrying a vertical pivot pin (not shown in the figure) and held by a screw represented in the figure solely by the tightening knob 19 which is suitable for tightening by hand. Its purpose is merely to secure the fork 14, 15 against vertical movements tending to tear apart the fork 15 which holds the bar 16 while nevertheless allowing the bar to pivot in the vertical direction.

FIG. 4 is an exploded view of some of the components of the coupling 3. There can be seen the part 9a with its semicircular hole for receiving the seat tube 6 or a matching sleeve 6a enabling the coupling to be fixed on various seat tubes, given that the diameters thereof vary from one manufacturer to another. A hole 6b serves to prevent the part 9a from rotating and consequently to prevent the coupling from pivoting relative to the seat tube 6. Ribs (no reference) can be seen in FIG. 4 and they serve to impart the required stiffness to the molded parts while nevertheless providing savings of molding material.

The fork 15 (of which only the portion 15a is shown in this figure) rests on the plate 11 about a pivot pin 13 mounted in the plate 11 via a shoulder 21 which is received in the housing 21a. When the screw 20 is tightened inside the pin 13, the pin can be held stationary so that tightening is effective by sliding a sharp object into the hole 12, there being a corresponding hole (not referenced) in the shell 9a. Normally, the pin 13 can pivot in its housing. It is covered by a sleeve 13a of relatively hard rubber so as to allow relative twisting between these two components.

The front portion 14 of the fork 15 rests on the plate 11 via a washer 23 having a low coefficient of friction, e.g. made of Teflon. The top portion of the pivot 13 is closed by the handle 19 whose threaded skirt 20 screws onto a thread on the pin 13 via a hole 25 in the part 15a. The vertical pivot axis 13 is held in the plate 10 by the shoulder 21. The projection 14 of a fork 15 receiving the tube 16 secured to the tow bar of the trailer 2 is mounted to pivot about the pin 13. To ensure that the trailer does not jack-knife to beside the bicycle when going downhill, the vertical axis of the pivot 13 preferably slopes rearwards at an angle of about 5°.

In accordance with the invention, the tube 16 is included in a rubber sleeve 17. On assembly, the parts 9 and the fork 15 are closed by means of the screws 18. The fork 15 is made up of two parts 15a and 15b each having a semicircular groove of the same diameter suitable for enabling the two parts to clamp onto the rubber sleeve 17 inside which the tube 16 of the trailer has been slid. As shown by arrow F1, the trailer can thus pivot in elevation about the axis of the tube 16. It can pivot in azimuth as shown by arrow F2. The trailer can thus perform a variety of movements independently of any action on the seat tube.

Figure 5:
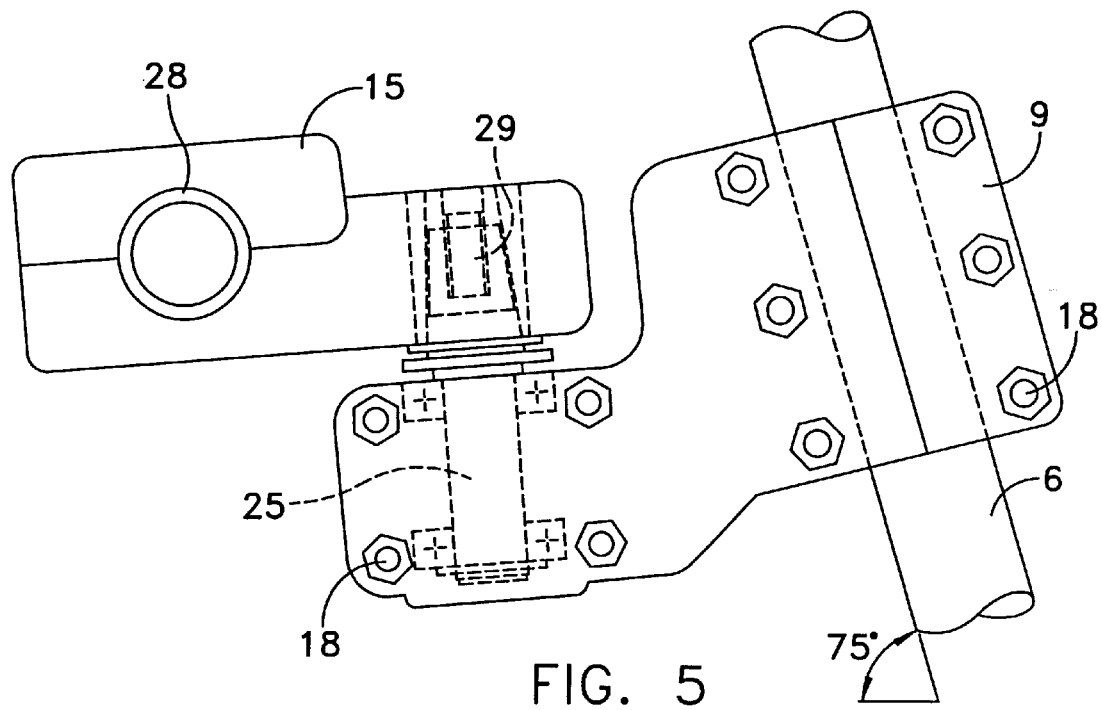
FIG. 5 is a view of another embodiment of the coupling.
Figure 6:
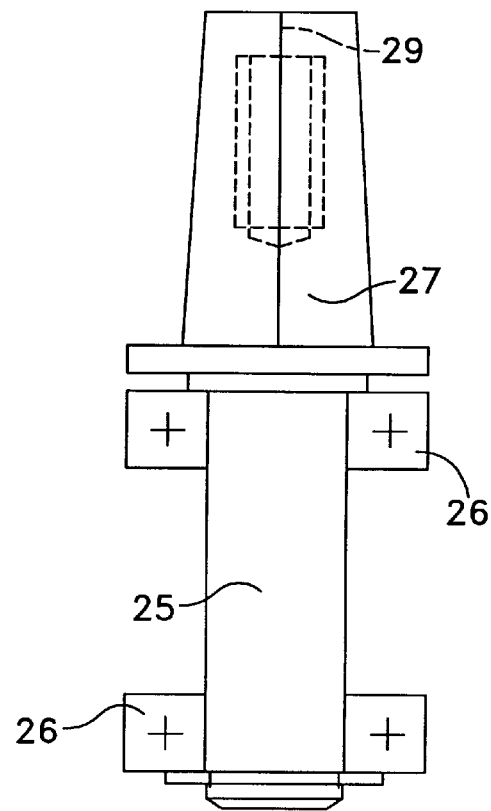
FIG. 6 shows a conical pivot for implementing the embodiment of FIG. 5.

In another embodiment as shown in FIGS. 5 and 6, in order to avoid the slack that can arise in an assembly of the kind described above, it is possible to use a conical pivot projecting from the fork. FIG. 6 shows the assembled pivot constituted by the pivot pin 25 mounted, in the example shown, in two ball bearings 26 so as to enable it to rotate freely. This pin is extended outside the plate 11 by a conical pivot 27 whose top portion has a threaded blind hole 29 for receiving the threaded rod of the knob 29. By means of this disposition, it is possible to provide an assembly with no slack between the fork is and the pin 25. As before, the link between the tow bar of the trailer and the fork 15 is obtained by means of a rubber sleeve. However in this embodiment, the sleeve is lined internally with a film 28 made of a material having a low coefficient of friction, such as Teflon. The two shells 15a and 15b of the fork 15 can thus be clamped together without preventing the bar 16 of the trailer from moving about the horizontal axis.

What is claimed is:

1. A trailer, in particular for a cross-country bicycle, the trailer comprising a chassis and one wheel, and having a tow bar suitable for securing to a seat tube via an articulated link, wherein said link has a fixing piece for fixing to the seat tube and including an inclined portion and a horizontal plate from which there projects a pivot pin on which a fork is pivotally mounted, the fork including a horizontal coupling tube of the trailer, the pivot pin sloping rearwardly at an angle of about 5° relative to the vertical, the tube of the trailer being included in a rubber sleeve.

2. A trailer according to claim 1, wherein the rubber sleeve includes an inner lining of material having a low coefficient of fiction.

3. A trailer according to claim 1, wherein the fork is mounted on the plate via a ring having a low coefficient of friction.

4. A trailer according to claim 1, wherein the fork is mounted on the plate via a conical pivot secured to a pin mounted in the plate via at least one ball bearing.

5. A trailer according to claim 1, comprising a metal chassis on which a shell of plastics material is secured.

6. A trailer according to claim 1, wherein wear rings are provided throughout the articulation.

7. A trailer according to claim 1, wherein the part and the fork are made by molding two symmetrical pieces which are united by means of screws.

* * * * *

UNITED STATES PATENT AND TRADEMARK OFFICE
CERTIFICATE OF CORRECTION

PATENT NO.    : 6,349,955 B1
DATED         : February 26, 2002
INVENTOR(S)   : Cottard et al.

It is certified that error appears in the above-identified patent and that said Letters Patent is hereby corrected as shown below:

Title page,
Item [73], Assignee, delete "Centre d'Innovation" and insert -- Plasturgie du Centre S.A.R.L. --.

Signed and Sealed this

Fifteenth Day of November, 2005

JON W. DUDAS
*Director of the United States Patent and Trademark Office*